Oct. 9, 1956

E. V. BERGSTROM 2,766,073

NOZZLE FOR CHARGING LIQUID HYDROCARBONS TO A MOVING BED
HYDROCARBON CONVERSION SYSTEM

Filed Nov. 20, 1951

INVENTOR.
Eric V. Bergstrom
BY
Charles A. Huggett
AGENT

United States Patent Office 2,766,073
Patented Oct. 9, 1956

2,766,073

NOZZLE FOR CHARGING LIQUID HYDROCARBONS TO A MOVING BED HYDROCARBON CONVERSION SYSTEM

Eric V. Bergstrom, Short Hills, N. J., assignor to Socony Mobil Oil Company, Inc., a corporation of New York Application November 20, 1951, Serial No. 257,271

6 Claims. (Cl. 299—121)

This invention is concerned with apparatus for introducing liquid charge into a reaction vessel. The invention is directed to an improved nozzle for introducing hydrocarbons in liquid form into contact with a solid contact bed in a convertor.

Moving masses of contact material granules have been used successfully to effect the conversion of hydrocarbons by bringing the solids into contact with the hydrocarbons continuously in a conversion zone. The solids are passed cyclically through the conversion zone where conversion is effected and then through a regenerating or reconditioning zone wherein it is contacted with a suitable gas for reconditioning said contact material to a condition suitable for reuse in said conversion zone.

Typical of processes to which the apparatus herein described may be applied is the catalytic conversion of liquid hydrocarbons to lower boiling, gasoline containing, gaseous products by the contacts of a high boiling liquid charge at temperatures of the order of 850° F. and above above with a moving bed of granular adsorbent catalytic material. Other exemplary processes to which this invention may be applied are the thermal visbreaking, coking or cracking of liquid or mixed phase hydrocarbon charge by contact with heated granular inert contact material.

In such processes, wherein the contact material is catalytic in nature, it may partake of the nature of natural or treated clays, bauzite, activated alumina or synthetic associations of silica, alumina, or silica and alumina to which other substances such as certain metallic oxides may be added in small amounts for specific purposes. When the contact material is inert in character it may partake of the form of refractory materials such as zirkite, corhart material, mullite or it may partake of the form of stones or metallic particles or balls. It is desirable to maintain the size of the contact material particles within the range about 3 to 100 mesh and preferably within the range 4 to 20 mesh by Tyler Standard Screen Analysis.

The term "gaseous" as used in this specification and claims is intended to refer to a material in the gaseous phase at the particular operating conditions of temperature and pressure involved regardless of what may be the normal phase of that material under ordinary atmospheric conditions. Similarly, "liquid" is intended to refer to a material in the liquid phase at the particular operating conditions involved regardless of its normal state under atmospheric conditions. The expression, "contact material" is employed herein in a broad sense as covering solid particles which are suitable as a contacting or heat carrying agent for the particular conversion involved regardless of whether such solid particles exhibit a catalytic effect toward the conversion or not. The term "granular" is used herein to denote pelleted, tableted, or spherical particles or pieces of regular or irregular shape and of palpable particulate form as distinguished from powdered material.

Formerly, only selected crudes were cracked which assumed a vapor state at the cracking temperature. The heavy demand for cracked products has made it necessary to charge heavier stocks to the reactor in liquid form at the existing temperature and pressure conditions. A major problem with feeding liquid stocks is the introduction of the liquid charge in such a manner that such liquid will be distributed uniformly over the entire column cross-section within the conversion zone. It has been found that in the usual moving bed system wherein the contact material is delivered directly onto the bed in the conversion zone through a plurality of uniformly spaced conduits, the procedure of simply spraying the liquid charge on the surface of the bed of contact material within the conversion zone results in the concentration of the liquid in the low places on the bed surface with resultant channelling through localized areas of the bed therebelow and very uneven carbonaceous contaminant distribution on the contact material. Further, it is necessary that the hydrocarbon charge be introduced to the conversion chamber in such a manner that none of the liquid comes in contact with heated metal surfaces in the upper portion of the conversion chamber since said metal surfaces exist at a temperature high enough to cause, upon contact by the liquid hydrocarbon charge, rapid conversion of said charge. The result of this rapid conversion is the formation of coke on the hot tubes and metal sections of the conversion chamber. This coke eventually breaks off from the metal surfaces in large pieces which pass downwardly through the conversion chamber and plug up restricted passages for contact material flow near the lower end of the conversion chamber and in other portions of the system.

Recently methods have been proposed for supplying liquid hydrocarbons and catalyst onto the bed in conversion zones wherein the catalyst is showered downwardly through an upper gas space onto the bed while liquid feed is sprayed onto the showering catalyst or downwardly within a falling curtain thereof. This invention provides an improved valve for uniformly spraying the liquid feed into the falling curtain in such a way that the liquids are evenly distributed throughout the bed. In preferred form contact material is showered downwardly onto the upper surface of a substantially compact bed of granular contact material as a central continuous curtain of horizontal cross-sectional area only a minor fraction of the horizontal cross-sectional area of said bed at its upper end. The liquid spray is directed downwardly toward the bed and tangentially toward the catalyst curtain, so that the liquid is distributed over approximately the same portion of the bed on which the catalyst curtain, so that the liquid is distributed over approximately the same portion of the spray actually intersects the curtain above the bed surface. If coking on the walls is to be avoided the force of liquid impingement on the curtain should not be so great that droplets break through the curtain and strike the wall in substantial quantities. It has been found that when the usual spray nozzles are employed, which involve a ring of orifices, the spray is not really circumferentially continuous, but is spotty. Droplets tend to get through the curtain with too much residual force. It has been found that by introducing the liquid through a continuous slotted aperture to form of a continuous conical flow pattern, the localization of high velocity droplets of substantial size is avoided. The spray is fine and less apt to get through to the walls in large amount.

A major object of this invention is the provision, in a system for the conversion of liquid or mixed phase hydrocarbons in the presence of a substantially compact moving bed of granular contact material, of apparatus for the introduction of liquid hydrocarbon charge to the conversion zone which avoids the difficulties described hereinabove.

Another object of this invention is to provide in a continuous cyclic process for conversion of high boiling liquid or mixed phase hydrocarbons to lower boiling gaseous hydrocarbons of apparatus which distributes the liquid hydrocarbon charge uniformly over the surface of the contact material column in the conversion zone without excessive accumulation of coky deposits upon metal surfaces within said zone.

A further object of this invention is to provide a nozzle for introducing liquid hydrocarbons into a conversion zone in the form of a continuous conical sheet of uniformly distributed finely atomized droplets.

These and other objects of this invention will become apparent in the following discussion of the invention and the drawings attached hereto, of which:

All of these drawings are highly diagrammatic in form.

Figure 1:
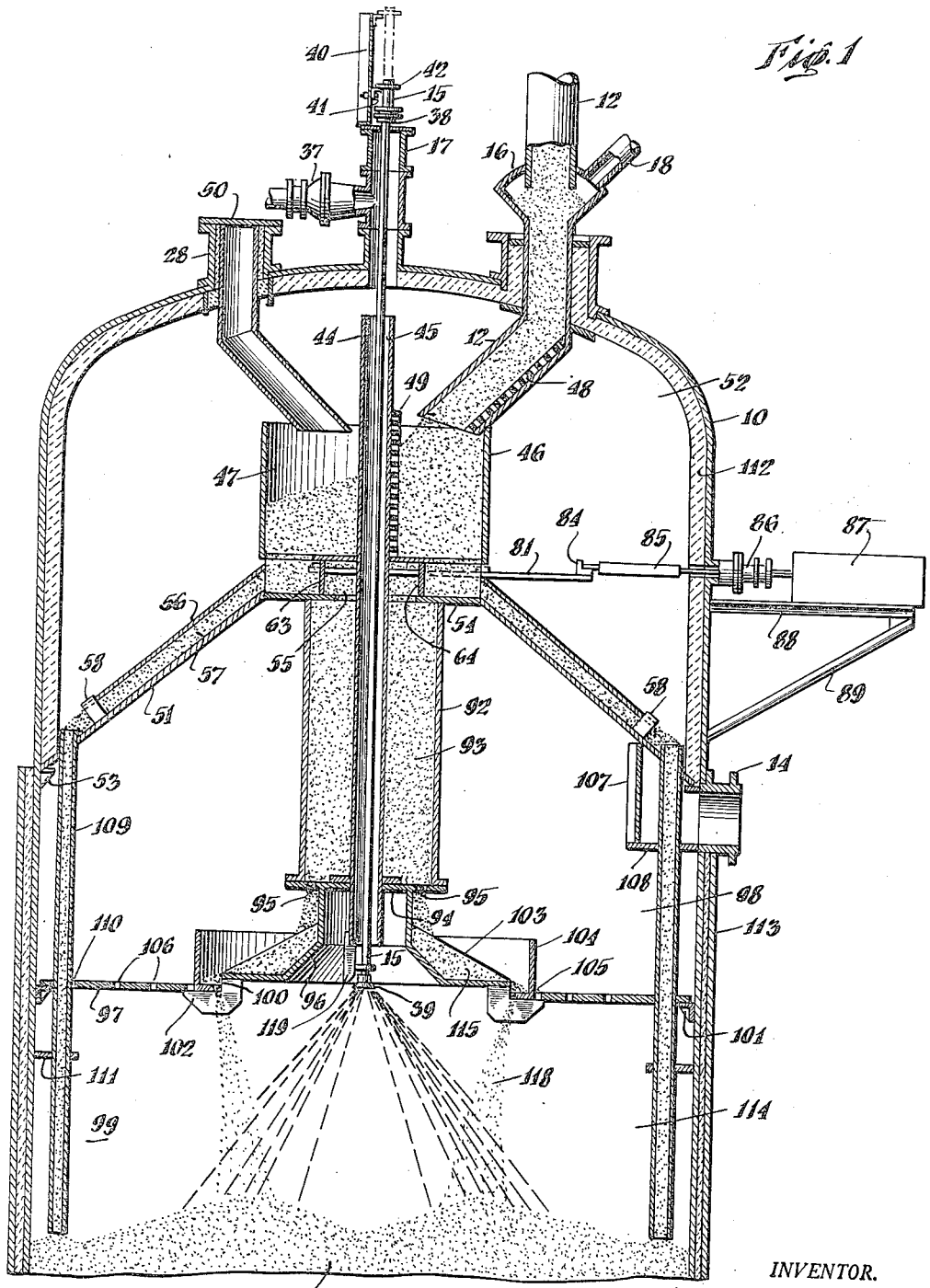
Figure 1 is an elevational view, partially in section, showing the improved liquid feeding device installed in the upper portion of a continuous moving bed hydrocarbon convertor.

Referring to Figure 1, the application of the improved nozzle to spray liquid hydrocarbon charge into the top section of a continuous moving bed convertor is illustrated. In these continuous cyclic systems the particles are gravitated as compact masses through the reactor and regenerator, where reaction of the hydrocarbon charge and reconditioning of the solids occur respectively. The solids are transferred from the bottom of one vessel to the top of the alternate vessel to complete the enclosed cyclic path. Elevators are sometimes used to lift the granular material such as continuous bucket elevators or those of the Redler type. In more recent moving bed systems an arrangement of reactor over the kiln is used in conjunction with a gas lift adapted to continuously lift the catalyst from a location below the kiln to a location above the reactor. Such a system is shown and claimed in copending application Serial Number 210,942, filed February 14, 1951, and will not be described in detail in this application.

Referring again to Figure 1, conduit 17 extends upwardly from the center of the upper end of the convertor 10 and has gate valve 37 positioned thereon intermediate its upper and lower ends. A stuffing box 38 is provided at the upper end of conduit 17 through which liquid feed pipe 15 may pass into the upper section of vessel 10. The spray nozzle 39, which is the subject of this invention, is attached to the lower end of pipe 15. Conduit 17 is made sufficient in internal horizontal cross-sectional area to permit the free passage of the spray nozzle 39 and pipe 15 therethrough. A suitable support member 40 with vertically adjustable angle piece 41 extends upwardly from the upper end of conduit 17 which pipe 15 has a stop, protuberance or flange 42 fixed thereon at an appropriate position so that the lower end of said pipe may be adjusted to any one of a number of different positions above contact material column 43 within vessel 10. A sleeve 44 fits loosely about pipe 15 and extends from a point just below the lower end of vessel 10 to a point shortly above nozzle 39. Sleeve 44 is of such a horizontal cross-sectional area that spray nozzle 39 will pass freely therethrough, thereby providing an annular space 45 between pipe 15 and the inner wall of sleeve 44. This arrangement of apparatus provides a system whereby liquid feed pipe 15 and nozzle 39 may be withdrawn from the vessel 10 at any time without completely shutting down operations within the vessel. This is disclosed in more detail in application Serial Number 235,980, filed July 10, 1951. A receptacle 46 of horizontal cross-sectional area substantially less than the horizontal cross-sectional area of vessel 10 is fitted about the upper section of sleeve 44 with the open end of the receptacle below the upper end of the sleeve so as to define a space 47 for contact material accumulation. The bottom of receptacle 46 is fastened tightly to the outside of sleeve 44. Feed leg 12 connects a storage vessel, not shown, with the upper section of vessel 10 and terminates at a point such that contact material from conduit 12 will be discharged into space 47 within receptacle 46. An erosion grating 48 is provided within the bottom of 12 over that portion of conduit 12 which is not substantially vertical within vessel 10 to prevent damage to conduit 12 by flowing contact material. An erosion grating 49 is also provided on the outside of sleeve 44 for a similar reason. A second conduit 28, extends into the upper end of vessel 10 and terminates within receptacle 46 so that vessel 10 may be refilled with contact material if the system has been drained. In normal operation this conduit is closed off by blind flange 50 or by means of a valve or seal. An upright frusto-conical partition 51 of the same upper diameter as receptacle 46 extends across vessel 10 so as to define a seal chamber 52 above partition 51 in the upper end of vessel 10. The lower end of partition 51 is supported by annular ring 53 attached to the inner periphery of vessel 10 at such a level that the upper end of 51 terminates at a level a fixed vertical distance below the bottom of receptacle 46. A horizontal circular partition 54 extends inwardly from the upper end of partition 51 and has an opening 55 at its center of substantially larger cross-sectional area than sleeve 44 through which the sleeve passes. A second frusto-conical partition 56 is fixed a spaced distance above said first named partition 51 and extending downwardly to a point adjacent to but not in contact with the inner periphery of vessel 10 so as to define a frusto-conical passageway 57 for contact material flow. Supports 58 are provided at the lower end of partition 56. A portion of the contact material gravitates from the center of the floor of the box 46 through the passageway 55 made by partitions 63, 64. The remaining contact material travels downwardly from the box 46 through the frusto-conical space 57 to the inner periphery of the vessel and downwardly through a ring of downcomers 109 arranged about the inner periphery of the vessel. The bed level in the vessel is maintained at the bottom of the ring of downcomers 109. Plate 81 has a bar 84 attached to its outer end. Bar 84 is fastened to a shaft 85 which extends through the wall of vessel 10 by means of stuffing box 86 to the exterior of the vessel. Connected to the outer end of shaft 85 is an operating mechanism 87 which may consist of any mechanism suitable to move the slide valve mechanism inwardly and outwardly to open and close communication between receptacle 46 and passageway 55. Operating mechanism 87 is supported by platform 88 and brace 89. Extending downwardly centrally from the underside of partition 54 beneath opening 55 is cylinder 92. Cylinder 92 is of greater cross-sectional area than opening 55 and fitted about sleeve 44 to form an annular chamber or passageway 93 for contact material. The lower end of passageway 93 is closed off by flange or plate 94 which fits tightly about sleeve 44. A plurality of orifices 95 penetrate flange 94 in a circular pattern at spaced apart points near the outer periphery of chamber 93. A partition consisting of two sections 96 and 97 extends horizontally across vessel 10 so as to define a plenum chamber 98 above said partition and a conversion chamber 99 therebelow. The central portion 96 of the partition extends downwardly from flange 94 as an upright cylinder of substantially greater diameter than sleeve 44 but of less diameter than that of the circular pattern of orifices 95. Partition section 96 flares outwardly until it becomes substantially horizontal on its outer end. Partition section 97 is in the form of an annular plate with inside diameter preferably but not necessarily slightly greater than the diameter of section 96 at its lower end so that a continuous annular opening 100 between sections 96 and 97 is formed. Section 97 lies in a horizontal plane a spaced distance below the lower end of section 96 and has an outside diameter slightly less than the inside diameter of vessel 10. Section 97 is supported on its outer edge by annular support member 101 attached to the inner wall of vessel 10 and is supported on its inner edge by a plurality of support members 102 attached to section 96. Support members 103 are spaced around the upper side of section 96 to prevent warping. The members or vertical vanes 103 also serve to provide a plurality of separate radially arranged passages for contact material flow from the orifices 95 to the annular opening 100. An upright cylindrical member 104 of diameter greater than the inside diameter of section 97 is fixed centrally on section 97 to prevent contact material from passing to that portion of section 97 not enclosed within cylinder 104. A continuous annular opening 105 passes through partition section 97 immediately beyond cylinder 104. A plurality of spaced apart orifices 106 pass through that area of section 97 beyond cylinder 104. Vaporized hydrocarbon charge port 14 extends into plenum chamber 98. A baffle 107 for dispersal of the vaporized charge through the plenum chamber is fixed in front of conduit 14 and supported by platform 108.

In operation, contact material enters vessel 10 together with seal gas from seal chamber 16 by means of conduit 12 and is discharged into receptacle 46. Seal gas distributes itself throughout seal chamber 52 within vessel 10. Contact material passes as a compact stream from receptacle 46 through the frusto-conical passageway 57. The contact material is transferred from the lower end of passageway 57 by means of conduits 109 to the upper surface of contact material column 43. The flow of contact material through conduits 109 acts to maintain the upper surface of 43 at about the same level. Contact material also flows downwardly through passageway 65, opening 55 and downwardly as a compact stream through chamber 92. Contact material is discharged from chamber 92 through orifices 95 and drops as a plurality of freely falling streams onto a stagnant layer of contact material 115 which is maintained on the surface of partition section 96 due to the configuration of section 96. Partition section 96 acts to baffle and disperse the contact material from orifices 95, the contact material passing downwardly over stagnant layer 115 and being discharged from the lower edge of 96 onto the inner edge of 97 from which it passes through annular opening 100 into the upper end of conversion chamber 99. The contact material showers downwardly as a continuous tubular curtain 118 onto an annular area on the upper surface of contact material column 43. The cross-sectional area enclosed by the area on which curtain 118 falls will be less than the cross-sectional area enclosed by annular opening 100 since the contact material is diverted by baffle 104 and the end of section 97 so that it tends to fall inwardly from the annular opening 100. As a result the internal diameter of the curtain or the area of the gas space inside the curtain is greater just below annular opening 100 than at the level of the surface of the column 43. On the other hand, the cross-sectional area of the curtain 118 is substantially greater at its lower end than at its upper end. In less preferred form of apparatus, plate 97 is eliminated and the curtain outer diameter grows larger as the contact material approaches the bed 43. Liquid hydrocarbon charge is sprayed by spray nozzle 39, positioned centrally within curtain 118 and a substantial distance above the surface of column 43, downwardly and outwardly toward the curtain 118. The liquid spray and curtain 118 are directed, prior to contact or mixing, along paths which converge above the column surface, so that the liquid is distributed over substantially the same portion of the column surface on which the catalyst curtain falls. In order to provide liquid contacting of the contact material outside the curtain, it is necessary for a portion of the spray to pass through at least a portion of the curtain 118 at a level shortly above the column surface. In order to obtain proper distribution of liquid and contact material, the density and thickness of the curtain immediately above the column surface and the direction and velocity of the liquid spray should be such that about 5 to 25 percent by volume of the liquid spray passes entirely through the curtain shortly above the column surface before reaching the column surface. The liquid should pass through the curtain not more than 8 inches above the nearest surface of the column. The curtain thickness and density may be controlled by control of the rate of contact material delivery to the shower and the diameter of the curtain and the height of material fall from the annular opening 100 to the column surface.

This invention discloses an improved nozzle for use in the center of the curtain of contact material which is adapted to spray a substantially continuous sheet of finely atomized hydrocarbon downwardly and outwardly in a pattern resembling a cone. The nozzle provides fine atomization of the droplets which is necessary for good distribution of the fluid hydrocarbon. The nozzle also imparts high velocity to the droplets for effecting the proper penetration of the curtain to reach the outer surface of the bed.

Figure 2:
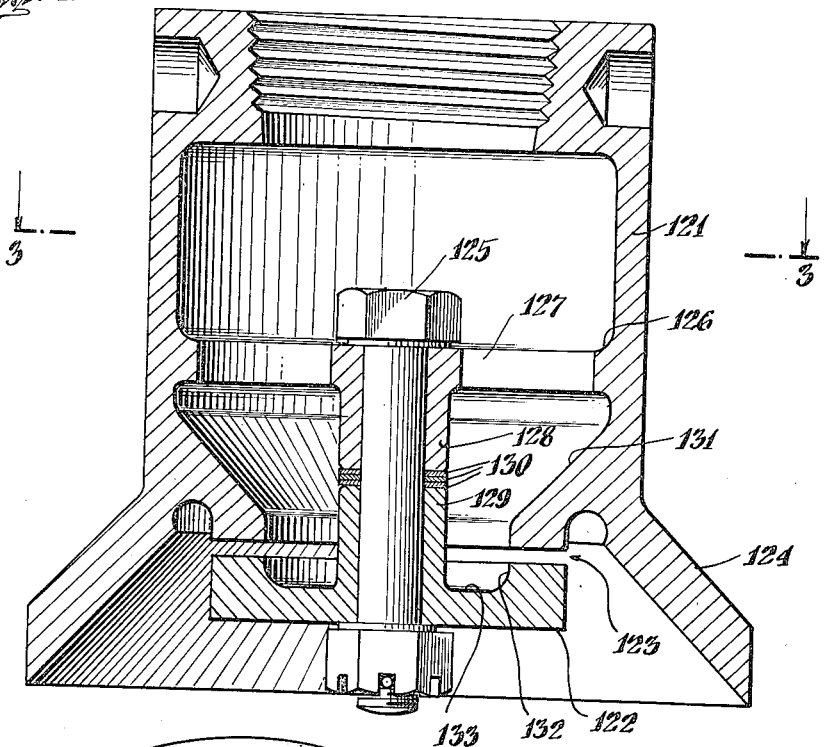
Figure 2 is an elevational view, in vertical section, showing the details of the improved liquid feeding device.
Figure 3:
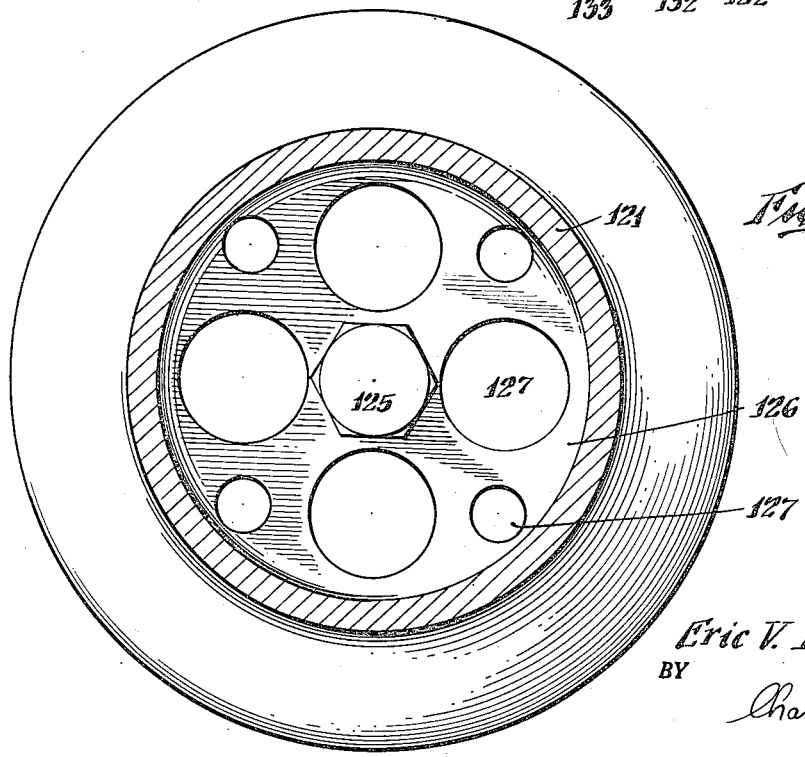
Figure 3 is a plan view, in horizontal section, shown on plane 3—3 of Figure 2.

The details of the liquid hydrocarbon spray nozzle assembly and a preferred nozzle are shown on Figure 2. The nozzle is provided with a central tubular body 121. An end member or cap 122 is supported below the end of the tubular body a spaced distance so as to define a continuous horizontal slot 123. The body has a rim or flange at or near the bottom thereof which terminates in a horizontal surface. The cap has a similar rim or flange located in alignment with and opposite the rim on the body which also terminates in a horizontal surface. The adjacent horizontal surfaces define a continuous narrow slot through which the liquid hydrocarbons are sprayed laterally with considerable force. A horizontally continuous impinging plate or splash plate 124 extends outwardly and downwardly from a level on body 121 above the continuous slot 123 to a level below the slot. The interior of the splash plate is spaced a substantial distance away from the slot at the level thereof. The laterally directed liquid strikes the splash plate with considerable force and is thereby finely atomized and directed downwardly and outwardly in a continuous conical flow pattern. The splash plate can be attached to the body in any conventional manner or may be an integral part of the body. The cap may be suspended from the body by a suitable attachment or may be, in less preferred forms of the invention, supported within the conversion vessel near the body of the nozzle but not physically connected therewith.

The slot is made as small as possible without being made so small that plugging would occur from carbonaceous or other solid impurities in the oil stream. This provides extremely fine droplets when the high velocity stream impinges upon the splash plate. The continuous slot provides improved distribution of the liquid droplets across the catalyst bed. The fine droplets lack the residual force to drive through the curtain to the walls of the vessel and, therefore, carbon formations on the wall of the conversion vessel are substantially reduced by this nozzle.

In the preferred form of the invention, the lower portion of the body has an outwardly sloping skirt 124 and inwardly sloping portion which terminates in a flange 131, having a horizontal surface. A web 126 is located at an intermediate level in the body. The horizontally disposed web has a multiplicity of holes for the free transfer therethrough of liquid hydrocarbons. A central boss 128 depends from the web and surrounding the boss is an annular passageway which communicates the interior of the body with the flanged portion thereof. A removable disc-shaped cap 122 has a central boss 129 and a circular flange 132 terminated in a horizontal surface. The flange and boss on the cap form a recess 133 therebetween. The bolt 125 is passed through a central opening in both bosses, bringing them into alignment and a nut 134 is threaded on the end of the bolt to lock the cap in position. A number of shims 130 which surround the bolt 125 are located between the mating bosses to provide for adjusting the clearance between the flanges on the body and cap to provide a continuous slot of carefully controlled thickness between the adjacent horizontal surfaces. An inlet is provided in the top of the body for introducing liquid hydrocarbons into the interior thereof. The outer edge of the opening or slot is spaced inwardly from the skirt and surrounded thereby, so that hydrocarbon liquid issuing from the opening at high velocity impinges on the skirt and is deflected thereby downwardly and outwardly.

The angle of the splash plate with the horizontal is selected so that the high velocity particles of fluid are broken into a fine spray with substantially no splashing back into the region below the body 121. A suitable range of splash plate angle with the horizontal is 40–50° with the preferred angle being 45°. The horizontal distance between the outer edge of the slot 123 and the inner wall of the splash plate must be substantially greater than the thickness of the slot, in order that the discharge velocity be controlled primarily by the slot and the flow pattern of the fluids be that of a continuous conical sheet. This can be arranged by properly locating the level of attachment of the splash plate to the body so that the desired clearance is effected at the level of the slot.

The splash plate extends a substantial distance below the slot to provide directional control of the conical sheet or flow pattern of the fluids. It is undesirable to have any substantial amount of the liquid projected through the curtain of contact material at too high a level because it produces excessive amounts of carbonaceous deposits on the inner wall of the conversion vessel. Prior nozzles, which used a ring of orifices, permitted the formation of droplets which were large enough to strike the curtain with considerable force and travel through the curtain into the inner wall of the reaction vessel. The instant invention avoids this because of the better atomization obtained by the continuous slotted aperture. With the continuous spray type nozzle, the localization of high velocity droplets of substantial size is avoided. The fine droplets lack the residual force to get through the curtain to the wall of the vessel. The contacting of the liquid with the solid particles is more uniform.

When the prior nozzle was operated at a flow rate substantially below the maximum nozzle capacity, the nozzle dripped forming localized regions of high hydrocarbon concentration directly below the nozzle. The undesirable dripping of the nozzle does not occur when using a continuous slotted aperture.

As an example illustrative of the invention a cylindrical catalytic cracking reactor having a diameter of 16 feet will be considered. Receptacle 46 had a diameter of 5 feet 4 inches while cylinder 92 therebelow had a diameter of 3 feet 2 inches. The contact material flow rate through the vessel was 372 tons/hour. The diameter of annular opening 100 was 7 feet but the diameter of the area enclosed by curtain 118 adjacent to the surface of the column was only 5 feet 6 inches due to the baffling of the contact material curtain inwardly by striking on partition section 97. There were 24 conduits 109 extending into conversion chamber 99 a distance of 5 feet 10 inches. About 80 percent of the total contact material flow occurred through annular opening 100. The nozzle body 121 had an outside diameter of 4 inches. The walls of the body were ¼ inch thick. The diameter of the splash plate inner wall at the bottom of the nozzle was 5⅞ inches. The splash plate was of frusto-conical shape at an angle of 45° with the horizontal and was about 2 inches long. The lower end of the body tapered inwardly to form, with the cap 122, a continuous horizontal slot having an outside diameter of 2⅞ inches and inside diameter of 2 inches. The slot thickness was adjusted 0.106±.002" by use of shims between the mating bosses on the web 126 and cap 122. The horizontal distance from the outer edge of the slot to the inner wall of the splash plate was ½ inch. The adjacent walls of the slot were made of stellite and a ring of stellite was imbedded in the inner wall of the splash plate at the level of the slot.

It should be understood that this invention covers all changes and modifications of the example of the invention chosen for purposes of disclosure, which do not constitute departures from the spirit and scope of the invention.

I claim:

1. A nozzle for spraying liquid hydrocarbons into a conversion chamber in the form of a substantially continuous conical flow pattern comprising in combination a body, a rim at the bottom of the body terminating in a horizontal surface, a cap adapted to be supported beneath the body, a rim located on the cap terminating in a horizontal surface, the rim on the body adapted to co-act with the rim on the cap to form between adjacent horizontal surfaces a substantially continuous slot of substantially uniform thickness, a passageway in said body communicating with the interior of the slot, means defining an inlet in the body communicating with the passageway, a continuous impinging plate attached to said body near its lower end which is adapted to receive a lateral spray of high velocity liquid from the slot, effect atomization of the liquid and direct it downwardly and outwardly in the form of a continuous conical sheet and said plate being spaced away from said slot a distance such that the area between said plate and the outer edges of said slot is greater than the vertical cross-sectional area of said slot through which liquid flows, whereby said slot acts as a throttle as liquid flows through the nozzle.

2. A nozzle for spraying liquid hydrocarbons into a conversion chamber in the form of a substantially continuous conical flow pattern comprising in combination a body, a rim at the bottom of the body terminating in a horizontal surface, a cap adapted to be supported beneath the body, a rim located on the cap terminating in a horizontal surface, the rim on the body adapted to co-act with the rim on the cap to form between adjacent horizontal surfaces a substantially continuous slot of substantially uniform thickness, a passageway in said body communicating with the interior of the slot, means defining an inlet in the body communicating with the passageway, a continuous impinging plate attached to said body so as to cover the slot, the plate being spaced laterally away from said slot at the level thereof such that liquid hydrocarbons sprayed laterally from the slot are atomized upon contacting the impinging plate and directed downwardly and outwardly in a continuous conical flow pattern and said plate being spaced away from said slot a distance such that the area between said plate and the outer edges of said slot is greater than the vertical cross-sectional area of said slot through which liquid flows, whereby said slot acts as a throttle as liquid flows through the nozzle.

3. A nozzle for spraying liquid hydrocarbons into a conversion chamber in the form of a continuous conical flow pattern comprising in combination a cylindrical hollow body, a rim at the bottom of the body terminating in a horizontal surface, a cap adapted to be located near the bottom of the body, a rim on the cap located in alignment with the rim on the body and terminated in a horizontal surface, the co-acting rims defining a horizontal slot of substantially uniform thickness for the discharge therethrough of liquid hydrocarbons at high lateral velocity, means defining an inlet in said body communicating with the interior thereof, a frusto-conical splash plate attached to said body above the slot, the splash plate being spaced laterally away from said slot at the level thereof and surrounding said slot at an acute angle with respect to the longitudinal axis of the body such that the liquid hydrocarbons are atomized and directed downwardly and outwardly in the form of a continuous conical flow pattern and said plate being spaced away from said slot a distance such that the area between said plate and the outer edges of said slot is greater than the vertical cross-sectional area of said slot through which liquid flows, whereby said slot acts as a throttle as liquid flows through the nozzle.

4. A nozzle for spraying liquid hydrocarbons into a conversion chamber in a continuous conical flow pattern comprising in combination a body, an outwardly sloping skirt at the bottom of the body and an inwardly sloping flange terminating in a horizontal surface, a horizontal web within said body, means defining holes in said web for the free transfer of fluid hydrocarbons a depending boss centrally located on the web, an annular passageway surrounding the boss which communicates with the flanged portion, means defining an inlet in the top of the body communicating with said passageway, an end member, a central boss and a continuous flange on the end member, said flange and boss forming a recess therebetween, said flange having a horizontal surface corresponding to and opposing the surface of the flange on said body, the boss on the body being in alignment with and connected to the boss on the end member, the length of the mating bosses being sufficient to provide a narrow continuous circular opening between the opposing flanges, the outer edge of the opening being spaced inwardly from the skirt and surrounded thereby, so that liquid issuing from the opening impinges on the skirt and is deflected thereby downwardly and outwardly.

5. A nozzle for spraying liquid hydrocarbons into a conversion chamber comprising in combination a hollow cylindrical body, an outwardly sloping skirt at the bottom of the body and an inwardly sloping flange terminating in a horizontal surface, a horizontal web within said body, means defining holes in said web for free transfer of fluid hydrocarbons, a depending boss centrally located on the web, an annular passageway surrounding the boss which communicates the upper interior of the body with the flanged portions, means defining an inlet in the top of the body, an end member, a central boss and a continuous flange on the end member, said flange and boss forming a recess therebetween, said flange having a horizontal surface corresponding to and opposing the surface of the flange on said body, the boss on the body being in alignment with and connecting with the boss on the end member, means for adjusting the vertical position of the end member, so as to provide an adjustable narrow continuous circular opening between the opposing flanges, the outer edge of the opening being spaced inwardly from the skirt and surrounded thereby, so that liquid issuing from the opening impinges on the skirt and is deflected thereby downwardly and outwardly.

6. A nozzle for spraying liquid hydrocarbons into a conversion chamber comprising in combination a hollow cylindrical body, an outwardly sloping skirt at the bottom of the body and an inwardly sloping flange which terminates in a horizontal surface, a horizontal web within said bolt, means defining holes in said web for free transfer of fluid hydrocarbons, a depending boss centrally located on the web, an annular passageway surrounding the boss which communicates the upper interior of the body with the flanged portion, means defining an inlet in the top of the body, a disc-shaped cap, a central circular boss and an annular flange on the cap, said flange and boss forming a recess therebetween, said flange having a horizontal surface corresponding to and opposing the surface of the flange on said body, a central bolt adapted to pass through a central opening in both bosses, so as to place them in vertical alignment, a nut adapted to threadably engage the lower end of the bolt, a multiplicity of circular shims adapted to encompass the bolt between the mating bosses, so that an adjustable narrow continuous circular opening is formed between the opposing flanges, the outer edge of the opening being spaced inwardly from the skirt and surrounded thereby, to effect impingement of liquid issuing from the opening on the skirt and thereby cause it to be deflected downwardly and outwardly.

References Cited in the file of this patent

UNITED STATES PATENTS

| | | |
|---|---|---|
| 2,556,198 | Lassiat | June 12, 1951 |
| 2,561,420 | Schutte | July 24, 1951 |
| 2,636,805 | Lassiat et al. | Apr. 28, 1953 |

FOREIGN PATENTS

| | | |
|---|---|---|
| 4,351 | Australia | of 1931 |